United States Patent [19]

Mallon

[11] 3,904,828

[45] Sept. 9, 1975

[54] COMPATIBLE SYSTEM FOR TRANSMITTING AND RECEIVING QUADRAPHONIC SIGNALS

[75] Inventor: Dietmar Mallon, Munich, Germany

[73] Assignee: Siemens Aktiengesellschaft, Berlin & Munich, Germany

[22] Filed: Mar. 23, 1973

[21] Appl. No.: 344,182

[30] Foreign Application Priority Data

Apr. 25, 1972 Germany.......................... 2220280

[52] U.S. Cl. .......................................... 179/15 BT
[51] Int. Cl.[2] ........................................ H04H 5/00
[58] Field of Search ..................... 179/15 BT, 1 GQ

[56] References Cited

UNITED STATES PATENTS

| | | | |
|---|---|---|---|
| 3,679,832 | 7/1972 | Halpern | 179/15 BT |
| 3,708,623 | 1/1973 | Dorren | 179/15 BT |
| 3,754,099 | 8/1973 | Takaoka | 179/15 BT |
| 3,787,629 | 1/1974 | Limberg | 179/15 BT |

OTHER PUBLICATIONS

The Quart Broadcasting System, by Gerzon, Audio Magazine, Sept. 1970.

Quadrasonics On–The–Air, by Feldman, Audio Magazine, Jan. 1970.

*Primary Examiner*—Kathleen H. Claffy
*Assistant Examiner*—Thomas D'Amico
*Attorney, Agent, or Firm*—Hill, Gross, Simpson, Van Santen, Steadman, Chiara & Simpson

[57] ABSTRACT

A system for transmitting and receiving quadraphonic signals employs means for combining four original input signals into three different composite signals which are then used to modulate a carrier and a subcarrier. One of the composite signals is representative of the sum of all four input signals, a second is representative of the sum of two of the inputs diminished by the sum of the third and fourth inputs, and the third is representative of the sum of the second and fourth inputs. The first composite signal modulates a carrier and the second and third composite signals modulate two sub-carrier signals in phase quadrature with each other. The modulated carrier and sub-carrier are demodulated at a receiver to produce the three composite signals, which are then combined to produce four independent output signals, each related to a pair of the original input signals.

5 Claims, 3 Drawing Figures

COMPATIBLE SYSTEM FOR TRANSMITTING AND RECEIVING QUADRAPHONIC SIGNALS

BACKGROUND OF THE INVENTION

1. Field of the Invention

The present invention relates to a radio transmission system and more particularly to a system for transmitting and receiving quadraphonic signals.

2. The Prior Art

An increase in the number of transmitted signals from two in a stereophonic system to four in a quadraphonic system increases the possible positions of a virtual sound source, from those lying on a line to those lying on a surface. The acoustic control of this surface by the use of four reproduction sources, makes it possible, if a suitable recording technique is employed, not only to improve the presentation of music recordings but also to enrich that of other kinds of recordings, for example those associated with plays, where the possibilities of spatial acoustic effects can advantageously be exploited. However, this can only be done if the transmission of four mutually independent pieces of information takes place in such a way that these pieces of information are independent of one another at the reproduction end. So-called pseudo-quadraphony systems can produce by a system of phase-shift, from two original signals, two further signals which are fed to separate loud-speakers. In this way, a surface effect is obtained, but this does not represent true reproduction of a recorded acoustic surface because the two further signals do not contain any additional information.

The recording and reproduction of four audio-frequency signals for genuine quadraphony, does not fundamentally involve any difficulty when record discs and tapes are used.

For example, there is disclosed in the magazine "Funkschau," 1971, edition 21, pages 693–695, a system which uses the matrixing of four quadraphony signals in two transmission channels to carry the entire information corresponding to the four quadraphony signals recorded on a record disc. Reproduction is carried out through four loud-speakers, after a corresponding dematrixing operation. By this method of matrixing of four signals in two channels, however, there results a certain information loss insofar as the four basic pieces of information cannot be restored again after the matrixing has been carried out. The four loud-speakers thus produce a mixed signal which, while it gives the listener a three-dimensional acoustic impression, does not enable specific sounds to be pinpointed.

Much the same applies to a system which has been described in the magazine "Funkschau," 1971, edition 13, pages 419–420. The starting assumption in this system is that it is possible to obtain from a two-channel program information components which, when reproduced by three or four loud-speakers, will give the listener the impression of being surrounded by an acoustic environment. It is suggested that by using several loud-speakers broadcasting in an identical manner, phantom sound sources can be generated for directional listening, and these sources pinpointed by the auditory senses. At the same time, however, it is pointed out that the facility for direct sound to emanate from all directions, must be included so that the general case of an acoustic event can be allowed for. However, in a system in which four pieces of signal information are coded into channels and can then only be reproduced in the form of sum information, it is precisely this which does not occur.

Genuine quadraphony is only possible if the four original signals can be reproduced as such. The transmission of four audiofrequency signals via F.M. radio, however, is subject to the restriction of the frequency band to between 30Hz and 53kHz which is the same frequency band as is already used for stereo transmission (i.e. two-channel transmission).

Moreover, a transmission system must be compatible and recompatible with an existing transmission system of which it is making an extended use. This means that a quadraphony transmission must be capable of reproduction through a stereo or monaural receiver, without any information loss, and that a quadraphony receiver must be capable of reproducing a monaural or stereophonic transmission in a monaural or stereophonic fashion.

BRIEF DESCRIPTION OF THE INVENTION

An object of the present invention is to provide a transmission system for the four audio-frequency signals of a quadraphonic recording, which system can use an F.M. channel for a two-channel transmission (stereo transmission) and is both compatible and recompatible with aa two-channel transmission and monaural transmission.

In one embodiment of the present invention, there is provided a radio system for transmitting and receiving quadraphonic signals in which a first audio frequency signal K1 is transmitted by modulation of the carrier, and supplementary signals are transmitted by modulation of a subcarrier which is suppressed before transmission, a second audio frequency signal K2 is transmitted by modulation of the subcarrier, and a third audio frequency signal K3 is transmitted by modulation of the same subcarrier phase-shifted by 90°; the three audio frequency signals $K_1$, $K_2$ and $K_3$ containing the information from four signal sources LV, RV, LH and RH in accordance with the four matrix equations:

$K_1 = LV+LH+RV+RH$ $K_2 = LV+LH-RV-RH$ $K_3 = LH+RH$ sum signals being formed in the receiver in accordance with the following matrix equations:

$LV+LH = \frac{1}{2}(K_1+K_2)$ $RV+RH = \frac{1}{2}(K_1-K_2)$ $LV+RV = K_1-K_3$ $LH+RH = K_3$ said sum signals being fed to an arrangement of four loudspeakers in which a loud-speaker to the right of a predetermined listening position receives the sum signal RV+RH, a loud-speaker to the left of the listening position the sum signal LV+LH, a loud-speaker in front of the listening position the sum signal LV+RV, and a loud-speaker behind the listening position the sum signal LH+RH.

Such a system makes it possible to carry out radio transmission of quadraphony signals using a frequency band assigned to stereo signals and the receiving arrangement is compatible and recompatible with monaural and stereo transmissions.

The three audio frequency signals $K_1$, $K_2$ and $K_3$ are assembled by a matrixing operation from four original signals LV, LH, RV and RH. The first signal $K_1$ in the low frequency band extending from 30 Hz to 15 kHz for example directly modulates the main carrier. The second and third audio frequency signals $K_2$ and $K_3$ modulate, with carrier suppression, a subcarrier of 38 kHz for example, the second signal $K_2$ modulating the subcarrier at zero phase for example, and the third signal $K_3$ modulating the subcarrier after the latter is shifted in phase by 90° for example.

In the receiver, the three channels are dematrixed, and in accordance with the above equations, four sum signals are formed, each of which is fed to a respective one of four loud-speakers. These loud-speakers are so arranged that they form the corners of a rectangle, preferably a square.

BRIEF DESCRIPTION OF THE DRAWINGS

Reference will now be made to the accompanying drawings in which.

DESCRIPTION OF THE PREFERRED EMBODIMENT

Figure 1:
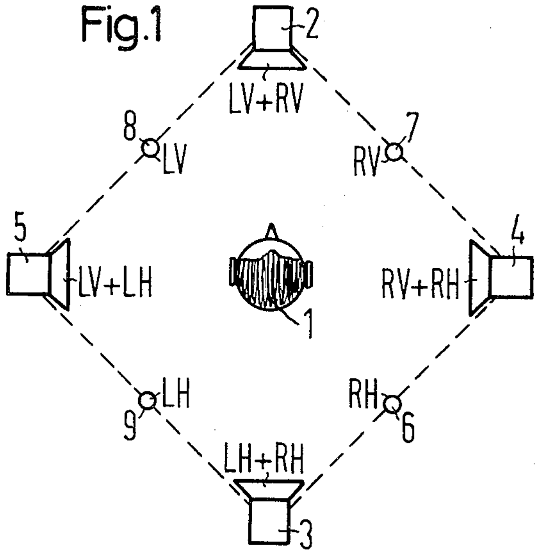
FIG. 1 shows the signal distribution with quadraphony transmission, employing an illustrative embodiment of the present invention.

Referring first to FIG. 1, centrally in front of the listener 1 there is a front loud-speaker 2, and centrally behind him there is a rear loud-speaker 3. To the right of the listener 1 there is a right loud-speaker 4 and to his left there is a left loud-speaker 5.

The alphabetic references in the Figures indicate the sum signals which are supplied to the loud-speakers 2–5 after dematrixing. The loud-speaker 2 receives the sum signal LV+RV, the loud-speaker 3 the sum signal LH+RH, the loud-speaker 4 the sum signal RV+RH and the loud-speaker 5 the sum signal LV+LH.

If, for example, the transmitter only radiates the signal RH, then this signal is reproduced in the same phase and with the same amplitude, by the two adjacent loud-speakers 3 and 4, so that centrally between the two loud-speakers 3 and 4 a phantom sound source 6 is created which reproduces the signal RH. Corresponding conditions apply to all the other signals and the sum signals. Between the pairs of loud-speakers 2, 4 and 2, 5 and 3, 5 accordingly, there are the phantom sources 7 to 9 respectively which reproduce the original audio-frequency signals RV, LV and LH, respectively.

If a stereo signal is being broadcast, then the channels $K_1$ and $K_2$ take the form:

$K_1 = L+R$ $K_2 = L-R$

The channel $K_3$ is not used with stereo transmission, so that the following signals are obtained which are supplied to the loud-speakers:

$L = \frac{1}{2}(K_1+K_2)$ $R = \frac{1}{2}(K_1-K_2)$ $L+R = K_1-K_3$ $O = K_3$

Figure 2:
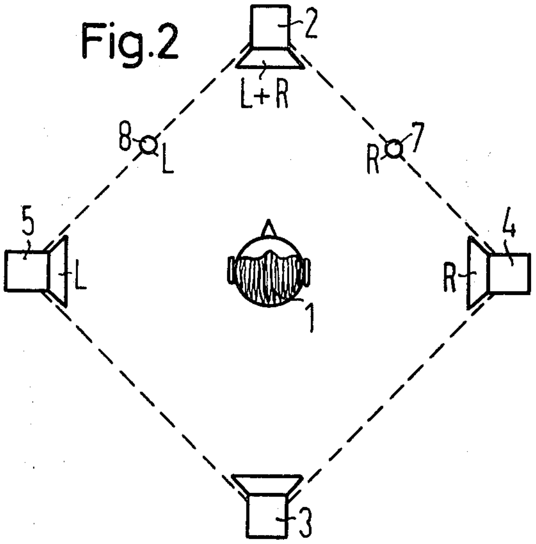
FIG. 2 shows the signal distribution with stereo transmission, employing an illustrative embodiment of the present invention.

FIG. 2 shows the signals which are applied to the individual loud-speakers in this case. The loud-speaker 2 receives the sum signal L+R, the loud-speaker 4 the signal R and the loud-speaker 5 the signal L. The loud-speaker 3 receives no signal. Then, from the phantom sound sources 7 and 8, the signals R and L respectively appear, corresponding with the original signals R and L.

With monaural transmission, the channels $K_2$ and $K_3$ are discarded. The channel $K_1$ transmits the whole of the information, here marked S. the dematrixing produces:

$\frac{1}{2}S = (K_1+K_2)$ $\frac{1}{2}S = (K_1-K_2)$ $S = (K_1-K_3)$ $O = K_3$

Figure 3:
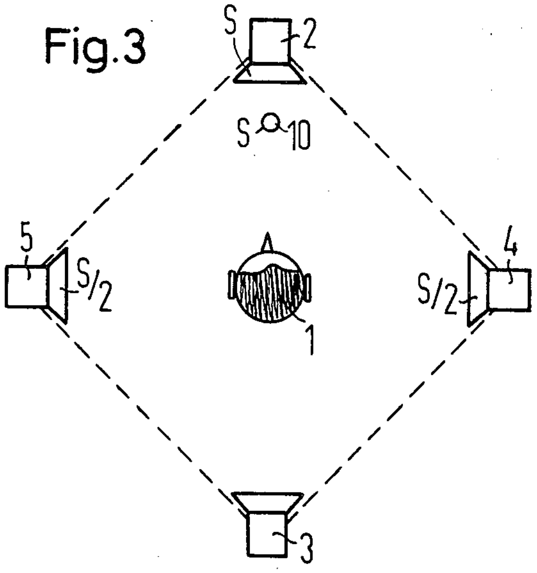
FIG. 3 shows the signal distribution with monaural transmission, employing an illustrative embodiment of the present invention.

FIG. 3 shows the signals which are applied to the individual loud-speakers in this case. The loud-speaker 2 receives a signal S, the loud-speakers 4 and 5 each receive the signal ½S. The loud-speaker 3 receives no signal. Thus, the phantom sound source 10 is formed between the listener 1 and the loud-speaker 2, which source reproduces the signal S.

If it is ensured that the transmitted signals are sinusoidal, then with quadraphony transmission the equations for the channels $K_1$, $K_2$ and $K_3$ are as follows:

$$K'_1 = LV\sin(2\pi f_{LV}t + \phi_{LV}) + LH\sin(2\pi f_{LH}t + \phi_{LH}) + RV\sin(2\pi f_{RV}t + \phi_{RV}) + RH\sin(2\pi f_{RH}t + \phi_{RH})$$

$$K'_2 = LV\sin(2\pi f_{LV}t + \phi_{LV}) + LH\sin(2\pi f_{LH}t + \phi_{LH}) - RV\sin(2\pi f_{RV}t + \phi_{RV}) - RH\sin(2\pi f_{RH}t + \phi_{RH})$$

$$K'_3 = LH\sin(2\pi f_{LH}t + \phi_{LH}) + RH\sin(2\pi f_{RH}t + \phi_{RH})$$

If $O \leq LV, LH, RV, RH \leq 1$, applies, then the maximum possible amplitudes of the composite signals are:

$K'_{1\,max} = 4$ $K'_{2\,max} = 4$ $K'_{3\,max} = 2$ if the quantities $K'_1$, $K'_2$ and $K'_3$ are standardized, then for the overall quadraphony multiplex voltage V, by which the carrier is modulated, we have:

$$V = 0.1\sin(2\pi f_{PT}t) + a\,K''_1 + a\,K''_2\sin(4\pi f_{PT}t) + 0.5\,a\,K''_3\cos(4\pi f_{PT}t)$$

where $K''_i = K'_i/K'_{i\,max}$, $i = 1,2,3,$ , $a$ is an arbitrary amplitude multiplying constant, and $f_{PT}$ is the pilot tone frequency, equal to half of the subcarrier frequency. The pilot tone is arranged to have an amplitude of 10% of the quadraphony multiplex voltage, by being partially supressed.

Furthermore:

$V_{max} = V(2f_{PT}t_o) = 1$ when $K''_1 = K''_2 = K''_3 = 1$, and $t_o$ is the time in each cycle that the maximum is reached. Accordingly, the value of the constant a is given by $$a = \frac{1 - 0.1\sin(2\pi f_{PT}t_o)}{1 + \sin(4\pi f_{PT}t_o) + 0.5\cos(4\pi f_{PT}t_o)}$$

The conditions for the maximum value of V can be found by setting the time derivative of the function for the voltage V equal to zero. Thus, at an angle $\alpha_o$ corresponding to $2f_{PT}t_o$:

$$\frac{dV(\alpha_o)}{dt} = 0.1\cos\alpha_o + a(2\cos 2\alpha_o - \sin 2\alpha_o) =$$

$$0.1\cos\alpha_o + \frac{1 - 0.1\sin\alpha_o}{1 + \sin 2\alpha_o + 0.5\cos 2\alpha_o}(2\cos 2\alpha_o - \sin 2\alpha_o) = 0$$

Solving, we obtain $$2 f_{PT} t_o = \alpha_o = 34.1°$$
$$a = 0.446$$

$$V = 0.1 \sin(2 f_{PT} t) + 0.446 K''_1 + 0.446 K''_2 \sin(4\pi f_{PT} t) + 0.223 K''_3 \cos(4\pi f_{PT} t)$$

The frequency sweep of channel $K''_3$ is only half those of the channels $K''_1$ and $K''_2$.

What is claimed is:

1. A method of transmitting and receiving quadraphonic signals comprising the steps of modulating a carrier signal with a first audio signal K1, modulating two subcarrier signals in phase quadrature with second and third audio signals K2 and K3, respectively, modulating said carrier signal with said two modulated subcarrier signals and suppressing said two subcarriers, modulating said carrier signal with a pilot signal having a predetermined phase relationship to said two subcarrier signals, transmitting said modulated carrier to a receiver, detecting said three audio signals K1, K2, and K3 by demodulating said carrier to produce said first audio signal K1, detecting said pilot signal, demodulating said carrier in a predetermined phase relation to said pilot signal to produce said second and third audio signals K2 and K3, and combining said three audio signals to form four individual output signals corresponding to four individual combinations of said four input signals by summing said first audio signal with said second audio signal to produce a first output signal, subtracting said second audio signal from said first audio signal to produce a second output signal, subtracting a third audio signal from said first audio signal to produce a third output signal, and providing said third audio signal alone as said fourth output signal, producing said first audio signal K1 by summing signals produced by four independent signal sources, producing said second audio signal K2 by summing signals produced by a first pair of said sources and diminishing the sum thus produced by the sum of signals produced by the other pair of sources, and producing said third audio signal K3 by summing the signal produced by one of said first pair of sources with the signal produced by one of said other pair of sources.

2. A radio system for transmitting and receiving quadraphonic signals in which a first audio frequency signal K1 is transmitted by modulation of the carrier, and supplementary signals are transmitted by modulation of a subcarrier which is suppressed before transmission, a second audio frequency signal K2 is transmitted by modulation of the subcarrier, and a third audio frequency signal K3 is transmitted by modulation of the same subcarrier phase-shifted by 90°; the three audio frequency signals $K_1$, $K_2$ and $K_3$ containing the information from four signal sources LV, RV, LH and RH in accordance with the four matrix equations:

$K_1 = LV+LH+RV+RH$
$K_2 = LV+LH-RV-RH$
$K_3 = LH+RH$ sum signals being formed in the receiver in accordance with the following matrix equations:

$LV+LH = \frac{1}{2}(K_1+K_2)$
$RV+RH = \frac{1}{2}(K_1-K_2)$
$LV+RV = K_1-K_3$
$LH+RH = K_3$ said sum signals being fed to an arrangement of four loud-speakers in which a loud-speaker to the right of a predetermined listening position receives the sum signal RV+RH, a loud-speaker to the left of the listening position the sum signal LV+LH, a loud-speaker in front of the listening position the sum signal LV+RV, and a loud-speaker behind the listening position the sum signal LH+RH.

3. The system according to claim 2, wherein the loud-speakers are arranged at the corners of a square.

4. The system according to claim 2, wherein a first pair of said four signal sources is representative of acoustic signals present at two adjacent corners of a square acoustical surface, and a second pair of said four signal sources is representative of acoustic signals present at the other two corners of said square acoustical surface.

5. The system according to claim 2, wherein said subcarrier has a frequency equal to the second harmonic of a frequency above the audio range.

* * * * *